(12) United States Patent
Zacche' et al.

(10) Patent No.: US 10,689,237 B2
(45) Date of Patent: Jun. 23, 2020

(54) NET WEIGHT FILLING MACHINE WITH VOLUMETRIC PUMP

(71) Applicant: WEIGHTPACK S.r.l., Goito, Mantova (IT)

(72) Inventors: Vanni Zacche', Mantova (IT); Enrico Cocchi, Mantova (IT)

(73) Assignee: WEIGHTPACK S.r.l., Goito, Mantova (IT)

( * ) Notice: Subject to any disclaimer, the term of this patent is extended or adjusted under 35 U.S.C. 154(b) by 265 days.

(21) Appl. No.: 15/833,748

(22) Filed: Dec. 6, 2017

(65) Prior Publication Data
US 2018/0170739 A1    Jun. 21, 2018

(30) Foreign Application Priority Data

Dec. 19, 2016 (IT) .............................. 102016128045

(51) Int. Cl.
*B65B 3/26* (2006.01)
*B67C 3/26* (2006.01)
(Continued)

(52) U.S. Cl.
CPC .............. *B67C 3/2614* (2013.01); *B67C 3/12* (2013.01); *B67C 3/242* (2013.01); *B67C 3/28* (2013.01); *F16L 55/053* (2013.01); *B67C 3/202* (2013.01)

(58) Field of Classification Search
CPC ........... B67C 3/12; B67C 3/225; B67C 3/206; B67C 3/2614; B67C 3/28; B67C 3/282; B67C 3/283; B67C 3/286
See application file for complete search history.

(56) References Cited

U.S. PATENT DOCUMENTS 3,645,303 A * 2/1972 Carter ....................... B67C 3/16
                                                         141/7
6,457,495 B1 * 10/2002 Meheen .................... B67C 3/10
                                                         141/40
(Continued)

FOREIGN PATENT DOCUMENTS

EP          0 228 514 A1      7/1987
EP          1 243 546 A2      9/2002
(Continued)

OTHER PUBLICATIONS

Italian Search Report for corresponding Italian Patent Application No. 102016000128045 dated Aug. 31, 2017, 14 pages.

*Primary Examiner* — Reinaldo Sanchez-Medina
(74) *Attorney, Agent, or Firm* — Merchant & Gould P.C.

(57) ABSTRACT

A weight filling machine is a volumetric valve type machine. The tank of the product to be dispensed using a hydrostatic flap is replaced by a dispensing system controlled by a volumetric pump. The machine (1) for filling containers (B) with a product includes a carousel (2) for moving the containers (B) and filling valves (5), each filling valve (5) being positioned above a clamp (4). A distribution duct (6) connects the filling valves (5) with a distribution manifold (8). The distribution duct (6) having the product has a filling pressure (P1). A feed duct (9) is intercepted by a volumetric pump (10). The volumetric pump (10) moves a filling product with a discharge pressure (P) greater than the filling pressure (P1) along the feed duct (9). An adjustment member (11) of the feed pressure of the filling product is placed downstream of the volumetric pump (10).

15 Claims, 6 Drawing Sheets

(51) Int. Cl.
*B67C 3/12* (2006.01)
*B67C 3/24* (2006.01)
*B67C 3/28* (2006.01)
*F16L 55/053* (2006.01)
*B67C 3/20* (2006.01)

(56) References Cited

U.S. PATENT DOCUMENTS

| | | | | |
|---|---|---|---|---|
| 7,469,726 | B2 * | 12/2008 | Clusserath | B67C 3/04 |
| | | | | 141/57 |
| 9,428,373 | B2 * | 8/2016 | Tanaka | B67C 3/287 |
| 2001/0045242 | A1 * | 11/2001 | Clusserath | B67C 3/12 |
| | | | | 141/144 |
| 2011/0277881 | A1 * | 11/2011 | Gruber | B67C 3/22 |
| | | | | 141/266 |
| 2012/0138192 | A1 * | 6/2012 | Campi | B67C 3/04 |
| | | | | 142/6 |
| 2013/0240081 | A1 * | 9/2013 | Balzarin | B67C 3/225 |
| | | | | 141/7 |
| 2015/0129083 | A1 * | 5/2015 | Bandini | B67C 3/28 |
| | | | | 141/9 |
| 2016/0194189 | A1 * | 7/2016 | Zoni | B65C 3/16 |
| | | | | 141/1 |

FOREIGN PATENT DOCUMENTS

| | | |
|---|---|---|
| JP | 2007-197062 A | 8/2007 |
| WO | 2004/018345 A1 | 3/2004 |
| WO | 2016/066774 A1 | 5/2016 |

\* cited by examiner

NET WEIGHT FILLING MACHINE WITH VOLUMETRIC PUMP

This application claims benefit of Ser. No. 10/201, 6000128045, filed 19 Dec. 2016, and which application is incorporated herein by reference. To the extent appropriate, a claim of priority is made to the above disclosed application.

FIELD OF THE INVENTION

The present invention relates to a weight filling machine of the volumetric valve type. More precisely, in this type of filling machines, the tank of the product to be dispensed using a hydrostatic flap is replaced by a dispensing system controlled by a volumetric pump.

BACKGROUND ART

Commercially available weight filling machines are of two types: with or without integrated tank for distributing the filling product.

The machines of the first type comprise a tank, usually placed on the rotating part of the filler, above the dispensing valves which fill the containers. Thereby, a flap is achieved, which, if the level in the distribution tank is maintained substantially constant, ensures a constant filling speed. The control of the product level inside the tank is mandated to a modulating valve of the pneumatic type which controls the product flow. Other solutions adopted to maintain constant or change the final filling flap as desired consist of the modulation of the gas pressure in the head space of the tank.

Although this type of filling machine is the most widely employed for the reasons set out above, it has, however, several disadvantages. First of all, it is a scarcely flexible system, since, when changing the filling product is desired, the washing and sterilizing operations require a long time, an additional wash circuit, the provision of spray balls and, in the case of aseptic machines, a management system for the sterilization of the gas pressurization assembly as well. Furthermore, in the case of highly viscous or two-phase products, the tank must be equipped with agitators or scrapers and, in the first case, the pressure in the tank may be so high as to require a certification of the tank itself. The bigger the tank is, the more evident these drawbacks are.

Figure 1:
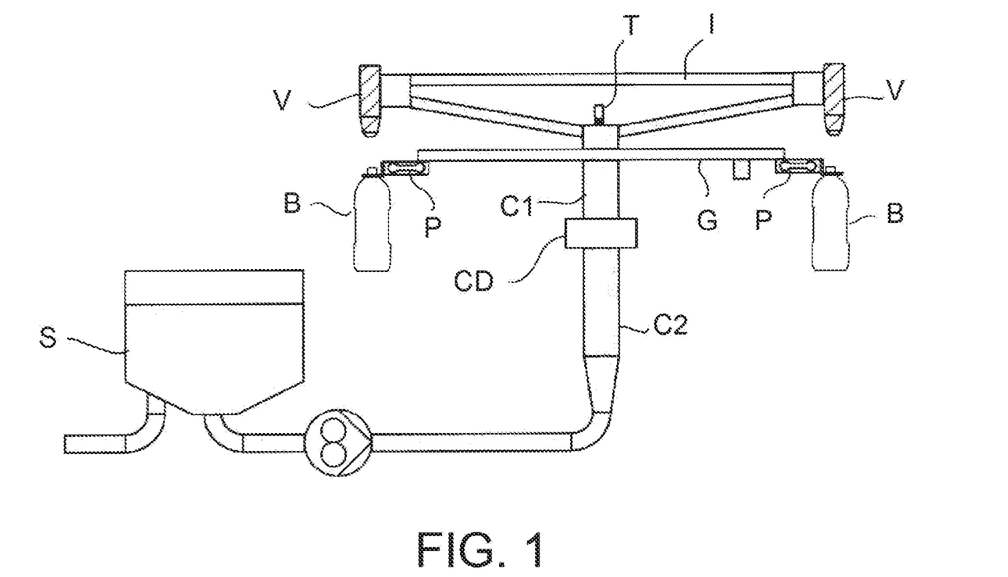
FIG. 1 shows a diagrammatic side view of a weight filling machine with volumetric pump in accordance with the prior art.

Therefore, a second type of weight filling machine has been proposed, in which the distribution tank is eliminated and the regularity of the flow dispensed is provided by a volumetric pump which draws from a remote tank. A simplified diagram of such a machine is shown in FIG. 1.

This machine has a simple layout, significantly reduces washing and sanitation times when changing the filling product, and does not require dedicated washing circuits. However, the diffusion thereof is limited by greater operational management difficulties, especially in the case of non-compressible products. In fact, the control of the flap is difficult to be implemented, especially in the production start and stop steps or in case a filling valve is to be excluded or reactivated, resulting in a sudden change in the dispensing pressure and, therefore, also in the relative speed.

Especially in the case of non-compressible products, the volumetric pump should be capable of restoring the filling valves output volume in real time. A misalignment or a delay in this dynamic implies an immediate and undesirable change in the filling pressure. Also in the hypothesis that the pump will perfectly re-integrate the output product, any change of product speed will result in a change in pressure at the dispensing valves level due to the dynamic pressure, essential to the acceleration/deceleration of the product itself.

In conclusion, filling machines without integrated tank do not allow the same operating results, in terms of precision of the filling flap, obtainable with fillers with integrated tank. A non-constant filling flap results into a non-constant dispensing speed and therefore in a complex management of the filling operations.

Currently, therefore, such a type of machine has been used only for products with high viscosity or which, due to air content or intrinsic features, are partially elastic.

SUMMARY OF THE INVENTION

There remains the need to provide a weight filling machine with volumetric valve and without integrated tank, which allows an optimal management of the filling process and is characterized by a simple layout and a high degree of flexibility.

Such a drawback is solved by a net weight filling machine, of the type using a feed volumetric pump, as the one outlined in the appended claims, the definitions of which form an integral part of the present description.

In particular, the invention relates to a filling machine of containers with a product, comprising:
- a carousel for moving a plurality of said containers;
- a plurality of filling valves, each filling valve being positioned above a clamp;
- a distribution duct connecting said filling valves with a distribution manifold, in said distribution duct having the product a filling pressure;
- a feed duct intercepted by a volumetric pump, wherein said volumetric pump provides to move a filling product with a discharge pressure greater than said filling pressure, wherein along the feed duct, downstream of the volumetric pump, an adjustment member of the feed pressure of the filling product is placed.

Further features and advantages of the present invention will become more apparent from the description of some embodiments, given below by way of indicative and non-limiting example.

DETAILED DESCRIPTION OF THE INVENTION

For illustrative purposes, FIG. 1 shows a weight filling machine with volumetric pump in accordance with the prior art.

The machine comprises a carousel G put in rotation by a motor (not shown) and at the edge thereof a plurality of clamps P is arranged, each supporting a container (for example, a bottle) B. Each clamp P is associated with a load cell for the dynamic weighing of the container during the filling. Above the carousel G a frame I is placed which supports, at the edge thereof, a plurality of filling valves V, each being positioned above a container B to be filled and integrally movable with respect to the carousel G.

The frame I comprises passages for the filling product, which put in flow communication the valves V with a distribution duct C1. The distribution duct C1 receives the filling product from a distribution manifold CD, which, in turn, receives the filling product from a feed duct C2.

The feed duct C2 is intercepted by a volumetric pump PV which draws the filling product from a remote tank S.

The distribution duct C1 comprises a pressure transducer T operatively connected to the volumetric pump PV by means of a drive and control unit (not shown). It is therefore apparent that, in prior art fillers, a sudden change in pressure detected by the transducer T (for example, when the filling valves V open or close) results into a stop/activation drive of the pump PV, which however will not be capable of resetting the pressure at the filling valves V in real time, and consequently the dispensing speed of the product will be subject to change. This fact does not ensure a proper and repeatable dosage of the product in the containers B.

FIGS. 2-5, 6A, 6B and 7 show a weight filling machine with volumetric pump in accordance with the invention, indicated as a whole with numeral 1.

With reference to a first embodiment of the invention, shown in FIGS. 2, 5, 6A and 6B, the weight filling machine 1 comprises, similarly to filling machines of the prior art, a carousel 2 hinged to a rotating junction 3 receiving a rotating movement from a motorization (not shown) in a synchronized manner with respect to means for inserting or drawing (not shown) a plurality of containers B into or from the carousel 2, for example, distribution stars.

Figure 2:
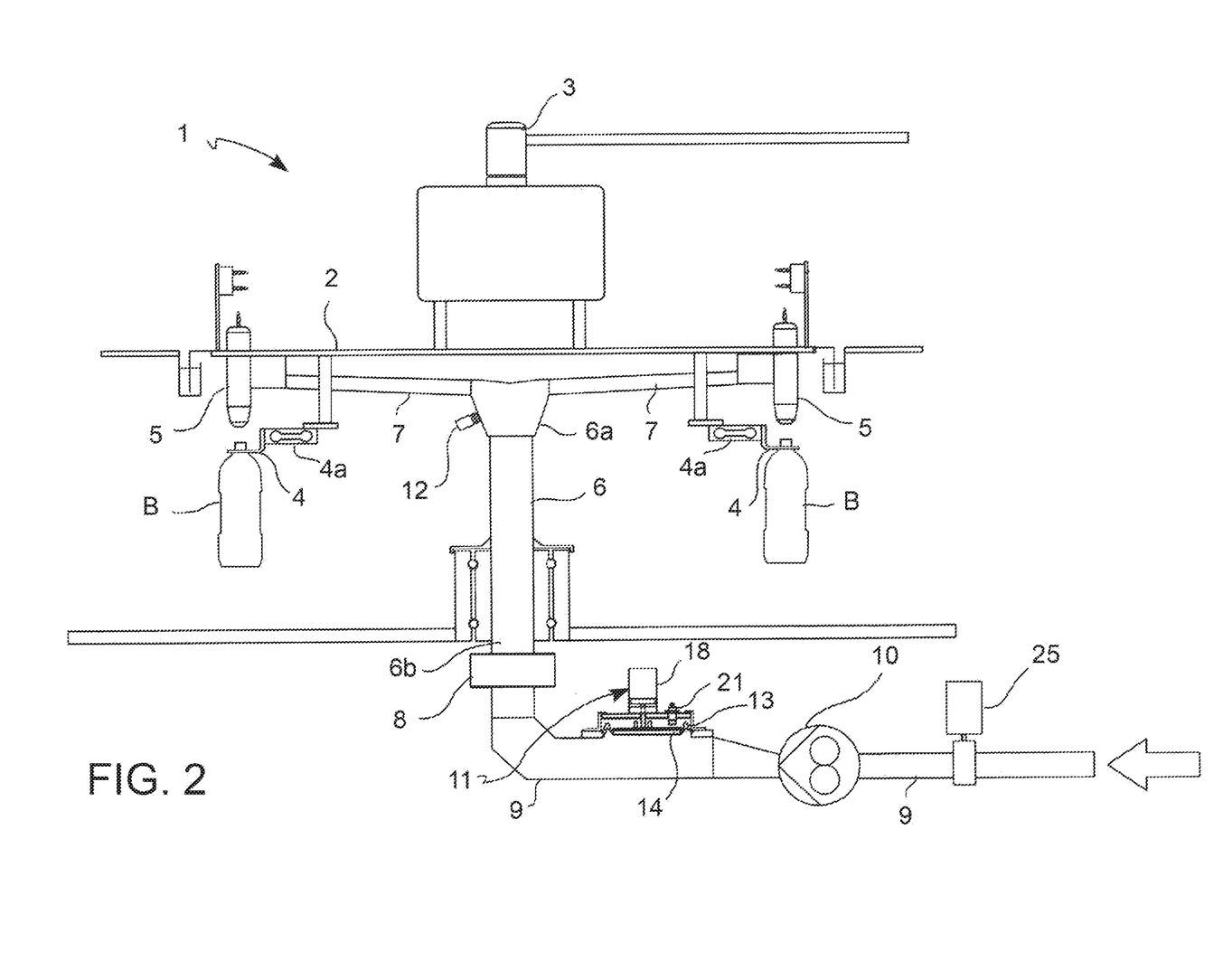
FIG. 2 shows a diagrammatic side view of a weight filling machine with volumetric pump in a first embodiment of the invention.

The carousel 2 peripherally comprises a plurality of clamps 4. Each clamp 4, of the conventional type, is adapted to support a container B, for example, in the case of bottles, maintaining it suspended by the neck or placing it on a suitable disk. Each clamp 4 or each disk is associated with a load cell 4a for dynamically determining the weight of the container B during the filling.

The carousel 2 also supports a plurality of filling valves 5, each filling valve 5 being positioned above a clamp 4, aligned to the mouth of a container B.

The filling valves 5 are in flow connection with a distribution duct 6 having a proximal end 6a, from which a plurality of pipelines for the connection 7 to said filling valves 5 extends radially, and a distal end 6b.

The proximal end 6a of the distribution duct 6 comprises a pressure sensor 12 for the control of the filling pressure.

The distal end 6b of the distribution duct 6 is connected to a distribution manifold 8, to which a feed duct 9 of the filling product leads.

The filling product may be of any type, although, in particular, it will be a high or low viscosity product, an inhomogeneous product, i.e. containing bits of different consistency, a compressible or non-compressible product.

The feed duct 9 is intercepted by a volumetric pump 10, which moves the filling product, originating from a remote tank (not shown), with a discharge pressure P.

The feed duct 9 is also intercepted, upstream of the volumetric pump 10, by a shut off valve 25, so as to be able to exclude the filling machine from the product tank in case of maintenance, washing and change of product.

Along the feed duct 9, downstream of the volumetric pump 10, an adjustment member 11 of the feed pressure of the filling product is placed. In the embodiment in FIG. 2 such an adjustment member 11 is positioned between the volumetric pump 10 and the distribution manifold 8.

Figure 5:
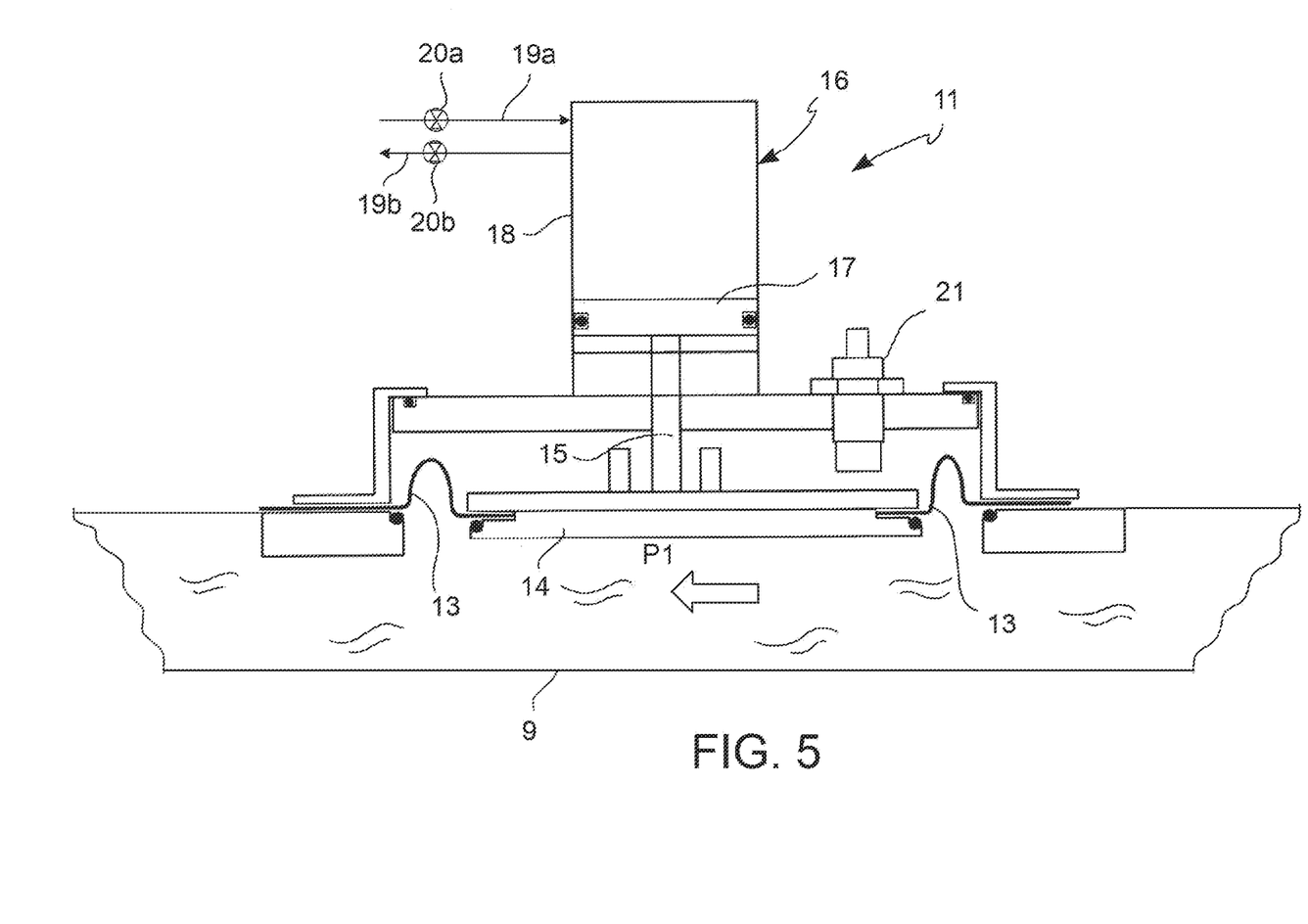
FIG. 5 shows a diagrammatic side view of a detail of a filling machine in FIG. 2.

With reference now to FIG. 5, at the adjustment member 11, the feed duct 9 is sectioned so as to allow the housing of said adjustment member 11.

The adjustment member 11 comprises a membrane 13, placed in tangential contact with the filling product flow originating from the discharge of the volumetric pump 10. The membrane 13 is comprised in a casing 11a of the adjustment member 11, of which it constitutes a side of contact with the filling product.

The membrane 13 is a flat membrane and is seal fastened on the adjustment member 11.

The membrane 13 is made of a flexible material, typically an elastomer, for example rubbers, silicones, or fluorinated polymers such as PTFE or TFM.

The membrane 13 is operatively associated to a pneumatic piston 16.

To this end, a plate 14 is fastened in a position central to the membrane 13. On the face opposite to the product flow, the plate 14 is fastened to a rod 15, slidable through the casing wall 11a and ending with a disk 17, the disk 17 being slidably housed in a cylinder 18, so as to obtain said pneumatic piston 16. A gas, typically pressurized air, is in fact placed inside the cylinder 18, at a pressure P2.

The surface A2 of the disk 17 is smaller than the surface A1 of the membrane 13-plate 14 assembly, so as to obtain a reduction ratio of the pressure applied by the membrane 13-plate 14 assembly on the filling product flowing in the feed duct 9, the function of which will become apparent from the following description.

In particular, the pressure P2 of the gas in the cylinder 18 will be greater than the pressure P1 applied by the membrane 13-plate 14 assembly on the product, corresponding to the dispensing pressure desired, in accordance with the equation:

$$P1 \cdot A1 = P2 \cdot A2$$

while the discharge pressure P of the pump will be adjusted so as to be greater than the pressure P1 applied by the membrane 13-plate 14 assembly on the product.

The cylinder 18 comprises an input line 19a and an output line 19b of the pressurized gas, each of such lines 19a, 19b being intercepted by a respective opening/closing valve 20a, 20b. Thereby, it is possible to maintain the pressure P2 inside the cylinder 18 substantially constant.

The adjustment member 11 comprises a position sensor 21 for the membrane 13, or for the membrane 13-plate 14 assembly. In particular, such a position sensor 21 is positioned on the casing 11a, so as to be facing the membrane 13 or the membrane 13-plate assembly, and therefore detect the change of distance of the membrane or of the membrane 13-plate 14 assembly towards or away from the sensor. The sensor 21 may be, for example, an inductive position sensor.

Figure 6A:
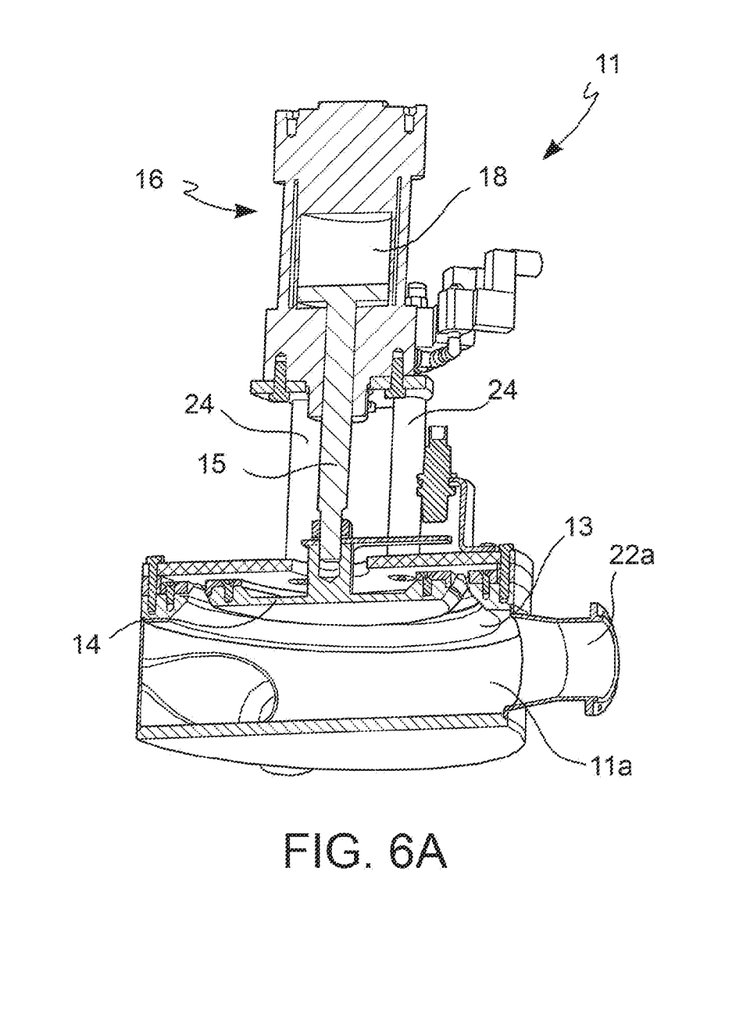
FIG. 6A shows a partial section side view of a variant of the detail in FIG. 5.
Figure 6B:
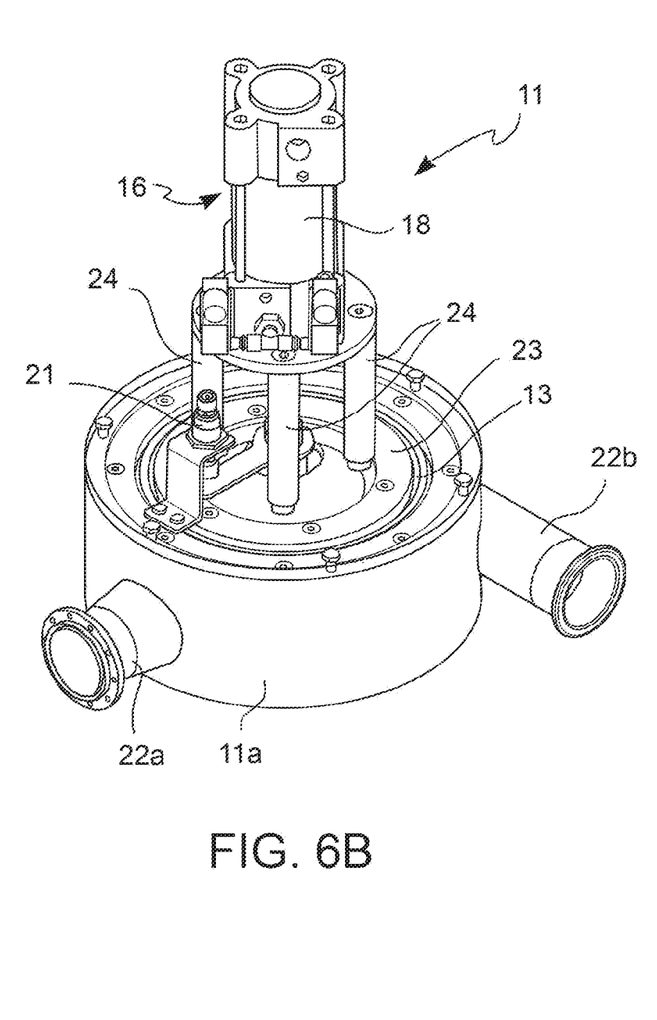
FIG. 6B shows a perspective view of the detail in FIG. 6A.

FIGS. 6A and 6B show a particular variant of the adjustment member 11.

The casing 11a is of a cylindrical shape and comprises an input sleeve 22a and an output sleeve 22b which will be fastened to parts of the feed duct respectively upstream and downstream of the adjustment member 11.

The sleeves 22a, 22b are placed at a right angle one another, in a diametrically opposite position, so that a sleeve 22a protrudes radially, while the other sleeve 22b protrudes tangentially from the casing 11a. Such a configuration is advantageous from the point of view of the encumbrance of the device.

The membrane 13-plate 14 assembly has an overall circular shape and forms a base of the cylindrical body of the casing 11a.

As in the embodiment previously described, the rod 15, sliding inside of the cylinder 18 of the pneumatic piston 16, is fastened to the plate 14.

The pneumatic piston 16 is fastened to a disc 23 by means of supporting legs 24. The disc 23 is in turn fastened to the casing 11a.

The casing 11a further supports the position sensor 21 of the membrane 13.

Figure 3:
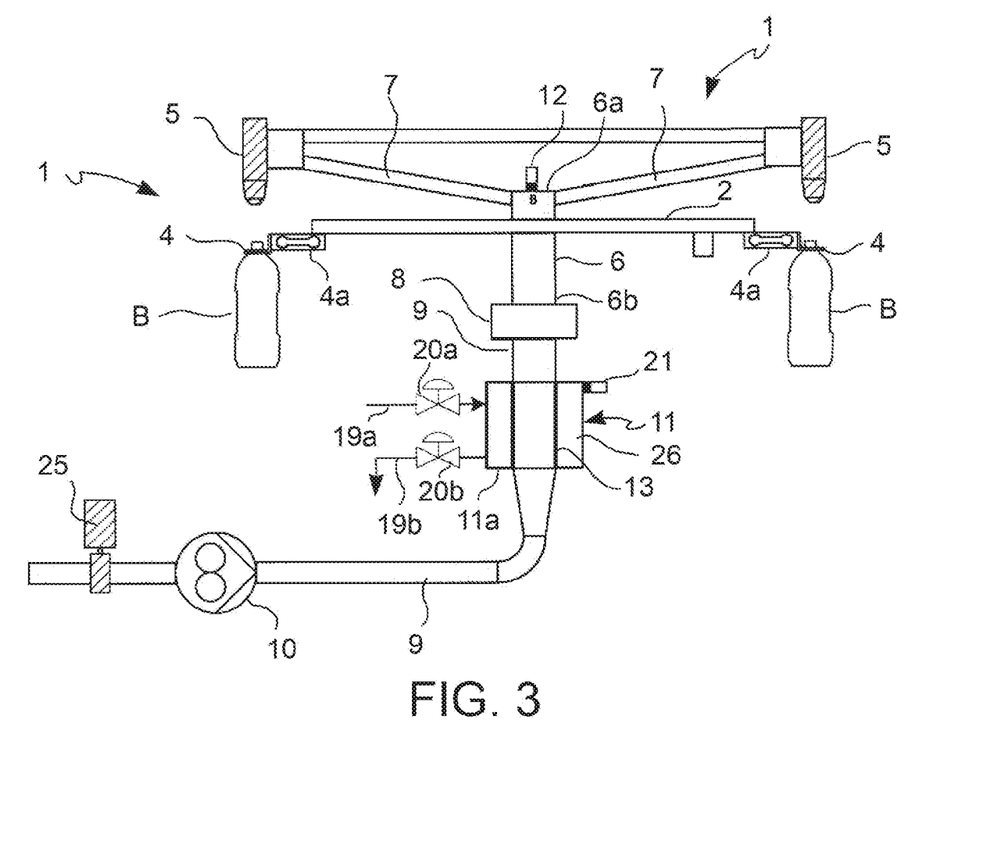
FIG. 3 shows a diagrammatic side view of a weight filling machine with volumetric pump in a second embodiment of the invention.

FIG. 3 shows a different embodiment of the filling machine 1 of the invention, in which the same parts are indicated by the same numbering.

Also in this embodiment, the adjustment member 11 is positioned between the volumetric pump 10 and the distribution manifold 8.

The difference between this embodiment and the one previously described is in the structure of the adjustment member 11. In this embodiment, a section of the feed duct 9 downstream of the volumetric pump 10 is replaced by a cylindrical membrane, which forms a tract of flexible pipe. The membrane 13 may be made of the same materials described above.

The casing 11a of the adjustment member 11 is coaxially arranged about the cylindrical membrane 13, so as to completely surround the membrane. The casing 11a comprises the position sensor 21, also in this case frontally arranged with respect to the cylindrical membrane 13, so as to detect the approach or distancing thereof.

The casing 11a comprises in the interior thereof a chamber 26, which surrounds the cylindrical membrane 13 and is filled with a pressurized gaseous fluid, typically pressurized air.

The chamber 26 is in flow communication with an input line 19a and with an output line 19b of the pressurized gas, each of such lines 19a, 19b being intercepted by a respective opening/closing valve 20a, 20b. Thereby, it is possible to maintain the pressure inside the chamber 26 substantially constant. Therefore, in this embodiment, a reduction ratio of the pressure such as that obtained by the pneumatic piston 16 of the embodiment in FIGS. 2, 5, 6A and 6B does not exist, therefore the pressure inside the chamber 26 will be equivalent to the pressure P1 which is applied by the membrane 13 to the product flowing in the feed duct 9.

Figure 4:
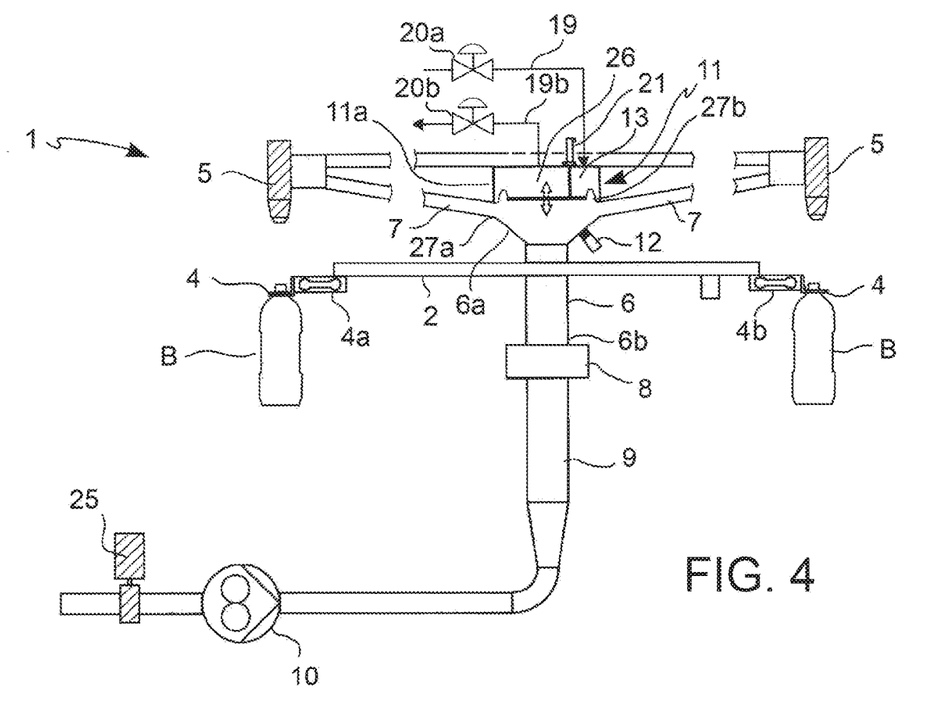
FIG. 4 shows a diagrammatic side view of a weight filling machine with volumetric pump in a third embodiment of the invention.

FIG. 4 shows a different embodiment of the filling machine 1 of the invention, in which the same parts are indicated by the same numbering.

In this embodiment, unlike in the previous ones, the adjustment member 11 is placed at the proximal end 6a of the distribution duct 6.

The proximal end 6a of the distribution duct 6 comprises a perimeter surface 27a, from which the pipelines for the connection 7 to said filling valves 5 originate radially, and an upper edge 27b on which the adjustment member 11 is fastened, so that the membrane 13, of a substantially flat shape, constitutes a separation surface between the proximal end 6a of the duct 6, in which the filling product flows, and the casing 11a of the adjustment member 11.

The casing 11a comprises in the interior thereof a chamber 26 filled with a pressurized gas (typically pressurized air) at the same pressure P1 the membrane 13 shall apply to the filling product in the duct 6.

Also in this case, the chamber 26 is in flow communication with an input line 19a and with an output line 19b of the pressurized gas, each of such lines 19a, 19b being intercepted by a respective opening/closing valve 20a, 20b, so as to maintain the pressure inside the chamber 26 substantially constant.

The casing 11a comprises the position sensor 21, also in this case frontally arranged with respect to the membrane 13, so as to detect the approach or distancing thereof.

Figure 7:
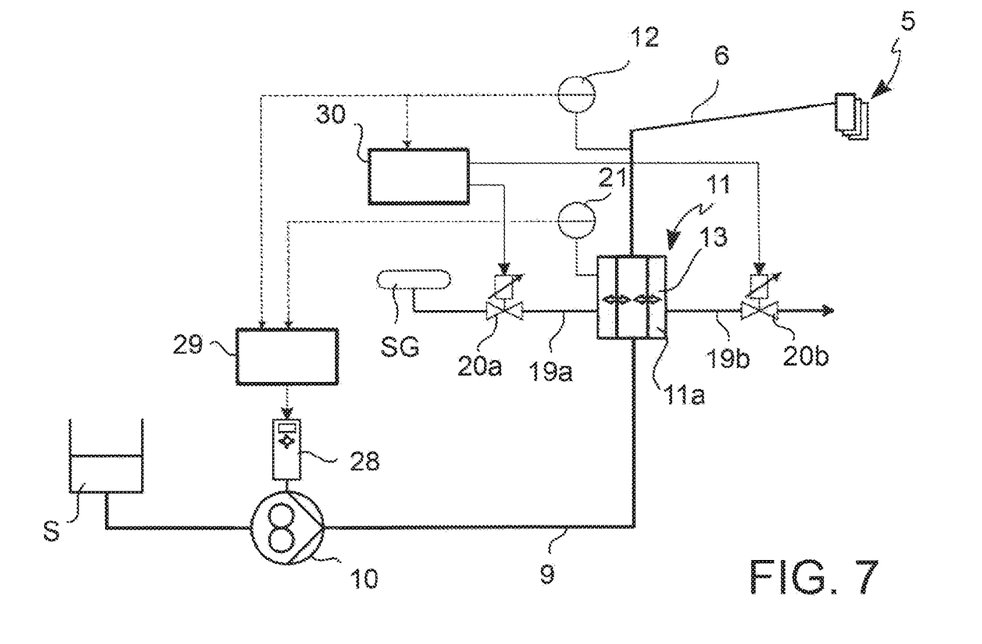
FIG. 7 shows a simplified diagram of the filling control system of the filling machine of the invention.

The filling machine in accordance with the invention comprises a drive and control system of the filling operation. FIG. 7 shows a simplified diagram of the drive and control system applied to the embodiment in FIG. 3, although it will be applied similarly as to the other embodiments.

The volumetric pump 10 is operatively connect to an actuator 28, preferably a brushless actuator. The actuator 28 is driven by a membrane position controller 29 receiving an input from the position sensor 21 of the membrane 13 and from the pressure sensor 12 reading the dispensing pressure in the distribution duct 6. The pressure sensor 12 further sends a control signal to the dispensing pressure controller 30, which drives the opening/closing of the valves 20a, 20b at the input 19a and output 19b lines of the pressurized gaseous fluid into and from the chamber 26 of the adjustment member 11 (or, in the case of the embodiment in FIG. 2, into and from the cylinder 18).

For the sake of completeness of the description, FIG. 7 also shows a filling product tank S connected to the volumetric pump 10 and a source of pressurized gas SG connect to the input line 19a.

Therefore, the dispensing pressure adjustment member 11 acts as a pneumatic spring on the fluid discharged by the volumetric pump 10, absorbing the changes in pressure caused downstream by factors such as the opening/closing of the dispensing valves 5. Depending on whether the pressure in the feed duct 9 increases (closing of one or more valves 5 downstream) or decreases (opening of one or more valves 5 downstream), the membrane 13 (or the membrane 13-plate 14 assembly) will expand or compress, respectively. Therefore, the position sensor 21 will detect, in the first case, a decrease in the distance (approach) of the membrane 13 and, in the second case, an increase in the distance (distancing) of the membrane 13. Thereby, the position sensor 21 will provide an input of such a detection to the controller 29, which will respectively send a switch-off or switch-on drive to the volumetric pump, so as to help restore the correct product filling pressure P1, which pressure P1 is maintained constant by the pressure applied on the product flow by the adjustment member 11.

It is therefore essential that the pressure P1 of the pressurized gas inside the adjustment member 11 is in turn maintained as constant as possible. This is ensured by the system for inserting or discharging pressurized gas through the lines 19a, 19b, operatively connected to the controller 30.

The embodiment in FIGS. 2, 5, 6A and 6B has the further advantage of comprising a system for reducing the pressure by virtue of the pneumatic piston 16. In practice, this system allows to have a pressure P2 inside the cylinder 18 substantially greater than the pressure P1 applied by the membrane 13, or by the membrane 13-plate 14 assembly, on the product flow in the feed duct 9. Since the movement of the membrane 13, in the various operating conditions of the machine, is small (for example, approximately 10 mm towards or away from the position sensor 21), if the interior volume of the cylinder 18 is sufficiently large, this small movement results into a change in the interior volume of the cylinder which is, in the percentage, very small. Therefore, the change in pressure P2 is also almost imperceptible, making in most cases the system for restoring the pressure P2 provided by the lines 19a, 19b for inserting and discharging the pressurized fluid unnecessary.

Figure 8A:
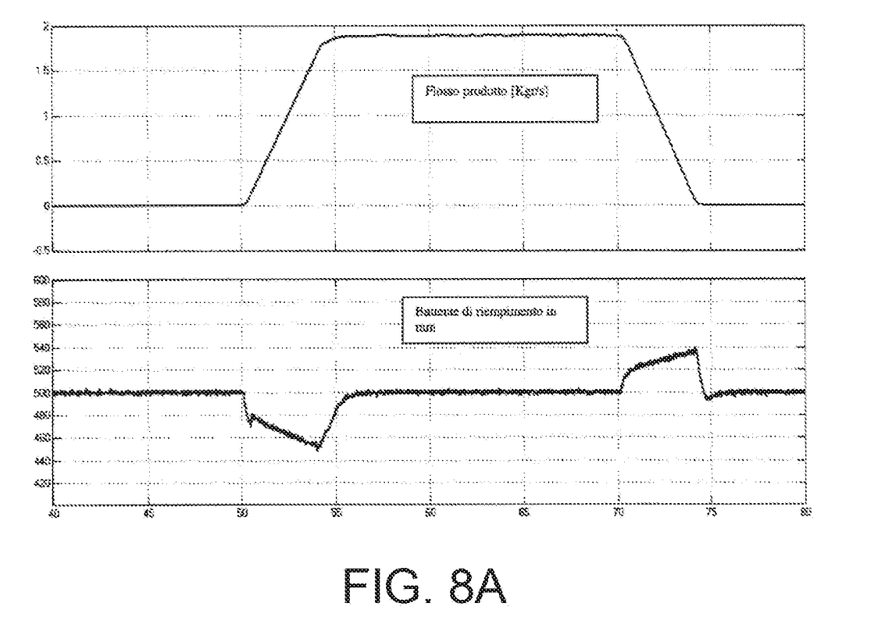
FIG. 8A shows charts of the change in product flow and in the corresponding filling flap in a filling machine with volumetric valve in accordance with the prior art.
Figure 8B:
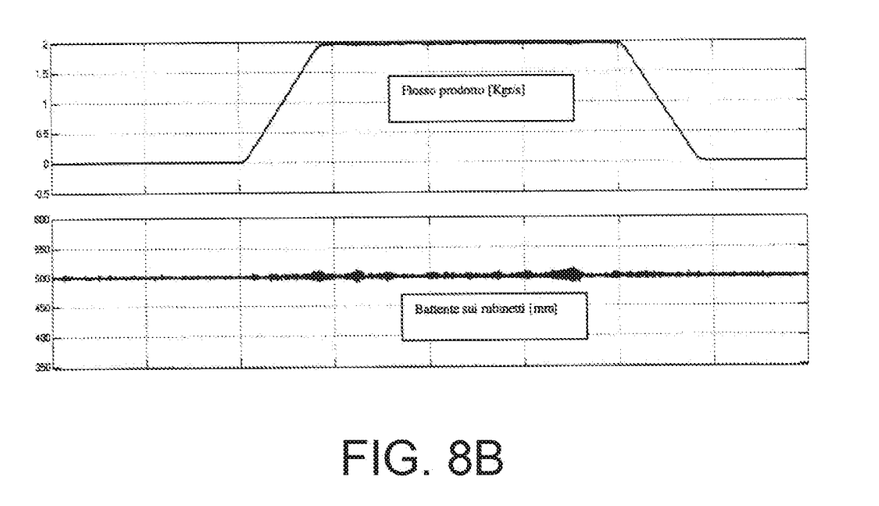
FIG. 8B shows charts of the change in product flow and in the corresponding filling flap in a filling machine with volumetric valve in accordance with the invention.

The filling machine according to the invention therefore achieves the preset objects by providing a filling process in which the product dispensing pressure, in other words, the so-called filling flap, remains constant, even during the discontinuous filling steps (opening and closing of valves 5). FIGS. 8A and 8B show charts comparing the change in product flow during such discontinuous processing steps with the relative change of the filling flap. FIG. 8A relates to a filling machine with volumetric valve according to the prior art, while FIG. 8B relates to a filling machine in accordance with the invention. As it may be noticed, while the machine of the prior art shows a substantial change of the flap during the opening and closing steps of the valves 5, with the machine in accordance with the invention such a flap is maintained constant.

The filling machine in accordance with the invention is further characterized by a simple and easy maintenance layout.

It is apparent that only some particular embodiments of the present invention have been described, to which those skilled in the art will be able to make all those modifications required for the adaptation thereof to particular applications, without thereby departing from the scope of protection of the present invention.

We claim:

1. A machine for filling containers with a product, comprising:
   a carousel for moving a plurality of said containers;
   a plurality of filling valves, each filling valve being positioned above a clamp;
   a distribution duct connecting said filling valves with a distribution manifold, wherein said distribution duct having the product includes a filling pressure;
   a feed duct intercepted by a volumetric pump, wherein said volumetric pump moves the product with a discharge pressure greater than said filling pressure, and an adjustment member for adjusting a feed pressure of the product, said adjustment member being positioned along the feed duct, downstream of the volumetric pump.

2. The machine according to claim 1, wherein the machine is a net weight filling machine.

3. The machine according to claim 1, wherein the feed duct comprises a proximal end and a distal end, wherein a plurality of pipelines for connection to said filling valves extends radially from the proximal end, the proximal end comprising a pressure sensor for control of the filling pressure.

4. The machine according to claim 1, wherein the adjustment member is positioned between the volumetric pump and the distribution manifold.

5. The machine according to claim 4, wherein the adjustment member comprises a membrane, or a membrane-plate assembly, placed in tangential contact with flow of the product, the membrane or membrane-plate assembly being in a casing and forming a side of the casing for contacting the product.

6. The machine according to claim 5, wherein said membrane or membrane-plate assembly is substantially flat and is operatively associated to a pneumatic piston.

7. The machine according to claim 5, wherein said plate in said membrane-plate assembly is fastened in a position central to the membrane, and
   wherein, on a face not in contact with the product flow, the plate is fastened to a rod, slidable through a wall of the casing and ending with a disk, the disk being slidably housed in a cylinder containing a gaseous fluid pressurized at a pressure greater than said filling pressure, and
   wherein the disk has a smaller surface than a surface of the membrane or of the membrane-plate assembly, to reduce a ratio of pressure applied on the product flowing in the feed duct.

8. The machine according to claim 7, wherein the cylinder comprises an input line and an output line of the pressurized gaseous fluid, each of the lines being intercepted by a respective opening/closing valve.

9. The machine according to claim 5, wherein the casing is cylindrical and comprises an input sleeve and an output sleeve for the product, said input and output sleeves being fastened to the feed duct respectively upstream and downstream of the adjustment member, wherein said input and output sleeves are placed at a right angle to one another, in a diametrically opposite position, so that one of said input and output sleeves protrudes radially, while the other of said input and output sleeves protrudes tangentially from the casing.

10. The machine according to claim 4, wherein a section of the feed duct downstream of the volumetric pump is replaced by a cylindrical membrane, forming a tract of flexible pipe, about the cylindrical membrane being coaxially arranged with a casing of the adjustment member, so as to completely surround the membrane, wherein the casing comprises in an interior thereof a chamber which surrounds the cylindrical membrane and is filled with a gaseous fluid pressurized at a pressure substantially equal to the filling pressure.

11. The machine according to claim 10, wherein the chamber is in flow communication with an input line and with an output line of the pressurized gaseous fluid, each of the input and output lines being intercepted by a respective opening/closing valve.

12. The machine according to claim 3,
   wherein the adjustment member is positioned at the proximal end of the distribution duct, said proximal end comprising an upper edge on which the adjustment member is fastened,
   said adjustment member comprising a membrane or a membrane-plate assembly, of a substantially flat shape, comprising a separation surface between the proximal end of the duct, wherein the product flows, and a casing, and
   wherein the casing comprises in an interior thereof a chamber filled with a gaseous fluid pressurized at a pressure substantially equal to the filling pressure.

13. The machine according to claim 12, wherein the chamber is in flow communication with an input line and with an output line of the pressurized gaseous fluid, each of the input and output lines being intercepted by a respective opening/closing valve.

14. The machine according to claim 5, wherein the adjustment member comprises a position sensor sensing the position of the membrane or of the membrane-plate assembly for detecting a change of distance of the membrane or of the membrane-plate assembly towards or away from the position sensor.

15. The machine according to claim 1, comprising a drive and control system of the filling machine, said drive and control system comprising:
  an actuator, operatively connected to said volumetric pump;
  a membrane position controller driving the actuator and receiving a control signal from a membrane or membrane-plate assembly position sensor and from a pressure sensor of the filling pressure;
  a filling pressure controller receiving a control signal from the pressure sensor and driving opening/closing of the valves at the input and output lines of the pressurized gaseous fluid into and from the chamber or into and from a cylinder of the adjustment member.

* * * * *